United States Patent
Tsukamoto

(10) Patent No.: US 11,977,038 B2
(45) Date of Patent: May 7, 2024

(54) INSPECTION APPARATUS AND INSPECTION METHOD

(71) Applicant: Canon Anelva Corporation, Kawasaki (JP)

(72) Inventor: Takeo Tsukamoto, Niigata (JP)

(73) Assignee: CANON ANELVA CORPORATION, Kawasaki (JP)

( * ) Notice: Subject to any disclaimer, the term of this patent is extended or adjusted under 35 U.S.C. 154(b) by 0 days.

(21) Appl. No.: 18/350,221

(22) Filed: Jul. 11, 2023

(65) Prior Publication Data
US 2023/0349845 A1      Nov. 2, 2023

Related U.S. Application Data

(63) Continuation of application No. PCT/JP2022/043905, filed on Nov. 29, 2022.

(30) Foreign Application Priority Data

Jan. 31, 2022   (JP) .................. 2022-013653

(51) Int. Cl.
*G01N 23/2206*   (2018.01)
*G01N 23/04*      (2018.01)
(Continued)

(52) U.S. Cl.
CPC ............ *G01N 23/18* (2013.01); *G01N 23/04* (2013.01); *G01N 23/083* (2013.01);
(Continued)

(58) Field of Classification Search
CPC ... A61B 6/4266; A61B 6/4014; A61B 6/4241; A61B 6/5205; A61B 6/5282;
(Continued)

(56) References Cited

U.S. PATENT DOCUMENTS 5,635,716 A   6/1997 Liu
5,742,658 A   4/1998 Tiffin et al.
(Continued)

FOREIGN PATENT DOCUMENTS

CN   105758345 A   7/2016
CN   206020314 U   3/2017
(Continued)

OTHER PUBLICATIONS

International Search Report (PCT/ISA/210) with translation and Written Opinion (PCT/ISA/237) dated Feb. 14, 2023, by the Japan Patent Office as the International Searching Authority for International Application No. PCT/JP2022/043905. (19 pages).

(Continued)

*Primary Examiner* — Don K Wong
(74) *Attorney, Agent, or Firm* — BUCHANAN INGERSOLL & ROONEY PC

(57) ABSTRACT

An inspection apparatus for inspecting an inspection target object, includes an X-ray generation tube having a target including an X-ray generation portion that generates X-rays by irradiation with an electron beam, and configured to emit X-rays to the inspection target object, and a plurality of X-ray detectors, wherein each of the plurality of X-ray detectors detects X-rays emitted from a foreign substance existing on an inspection target surface of the inspection target object irradiated with the X-rays from the X-ray generation portion and totally reflected by the inspection target surface.

22 Claims, 11 Drawing Sheets

(51) Int. Cl.
*G01N 23/083* (2018.01)
*G01N 23/18* (2018.01)
*G01N 23/20008* (2018.01)
*G01N 23/223* (2006.01)
*G21K 7/00* (2006.01)
*H01J 35/18* (2006.01)

(52) U.S. Cl.
CPC ... *G01N 23/20008* (2013.01); *G01N 23/2206* (2013.01); *G01N 23/223* (2013.01); *G21K 7/00* (2013.01); *H01J 35/186* (2019.05); *G01N 2223/04* (2013.01); *G01N 2223/052* (2013.01); *G01N 2223/071* (2013.01); *G01N 2223/076* (2013.01); *G01N 2223/1016* (2013.01); *G01N 2223/20* (2013.01); *G01N 2223/204* (2013.01); *G01N 2223/32* (2013.01); *G01N 2223/643* (2013.01); *G01N 2223/652* (2013.01)

(58) Field of Classification Search
CPC .................. A61B 6/483; A61B 6/4028; G01N 2223/076; G01N 2223/079; G01N 2223/204; G01N 23/223; G01N 23/2252
See application file for complete search history.

(56) References Cited

U.S. PATENT DOCUMENTS

| | | | |
|---|---|---|---|
| 6,005,915 | A | 12/1999 | Hossain |
| 6,041,096 | A | 3/2000 | Doi et al. |
| 6,829,327 | B1 | 12/2004 | Chen |
| 6,850,598 | B1 | 2/2005 | Fryda |
| 7,221,731 | B2 | 5/2007 | Yada |
| 7,916,834 | B2 | 3/2011 | Piorek |
| 9,213,007 | B2 | 12/2015 | Matoba |
| 10,269,536 | B2 | 4/2019 | Takada |
| 11,467,107 | B2 | 10/2022 | Aoyama |
| 2004/0208280 | A1 | 10/2004 | Yada |
| 2008/0192897 | A1 | 8/2008 | Piorek et al. |
| 2013/0101085 | A1 | 4/2013 | Kita |
| 2014/0067316 | A1 | 3/2014 | Ishibashi |
| 2014/0294144 | A1 | 10/2014 | Matoba |
| 2015/0204806 | A1 | 7/2015 | Mazor |
| 2015/0247811 | A1 | 9/2015 | Yun |
| 2017/0052128 | A1 | 2/2017 | Yun |
| 2017/0299528 | A1 | 10/2017 | Ogata |
| 2018/0189944 | A1 | 7/2018 | Kirschenman |
| 2019/0212281 | A1 | 7/2019 | Shchegrov |
| 2020/0098539 | A1 | 3/2020 | Suzuki |
| 2021/0088459 | A1 | 3/2021 | Kita |
| 2021/0389262 | A1 | 12/2021 | Aoyama |
| 2023/0236143 | A1 | 7/2023 | Zhang |

FOREIGN PATENT DOCUMENTS

| | | | | |
|---|---|---|---|---|
| CN | 108401442 | A | | 8/2018 |
| CN | 112074728 | A | | 12/2020 |
| JP | H05346411 | A | | 12/1993 |
| JP | H09318565 | A | | 12/1997 |
| JP | 2000055841 | A | | 2/2000 |
| JP | 2005292077 | A | | 10/2005 |
| JP | 2007-212468 | A | | 8/2007 |
| JP | 2009236622 | A | | 10/2009 |
| JP | 2010518406 | A | | 5/2010 |
| JP | 2013044644 | A | | 3/2013 |
| TW | 305934 | B | | 5/1997 |
| TW | I388821 | | | 3/2013 |
| TW | 201531696 | A | | 8/2015 |
| TW | I638996 | | | 10/2018 |
| TW | 201940841 | | | 10/2019 |
| WO | 95/23963 | | | 9/1995 |
| WO | 2008100914 | A2 | | 8/2008 |
| WO | 2017104659 | A1 | | 6/2017 |
| WO | WO-2020084890 | A1 | * | 4/2020 ........... G01N 23/223 |

OTHER PUBLICATIONS

Copending U.S. Appl. No. 18/350,255, filed Jul. 11, 2023, by Takeo Tsukamoto.
Copending U.S. Appl. No. 18/350,093, filed Jul. 11, 2023, by Takeo Tsukamoto.
Copending U.S. Appl. No. 18/350,054, filed Jul. 11, 2023, by Takeo Tsukamoto.
Copending U.S. Appl. No. 18/350,361, filed Jul. 11, 2023, by Takeo Tsukamoto.
Office Action dated Oct. 4, 2023 by the Taiwan Intellectual Property Office in Taiwanese Patent Application No. 112103028, and an English Translation of the Office Action. (7 pages).
Office Action dated Sep. 14, 2023, by the U.S. Patent and Trademark Office in U.S. Appl. No. 18/350,054.
Notice of Allowance dated Oct. 31, 2023 by the U.S. Patent and Trademark Office in U.S. Appl. No. 18/350,093.
Office Action dated Oct. 3, 2023, by the Taiwan Intellectual Property Office in Taiwanese Patent Application No. 112103030, and an English Translation of the Office Action. (9 pages).
Office Action issued in Taiwanese Patent Application No. 112102600, dated Sep. 21, 2023, with English Translation (15 pages).
Office Action dated Sep. 13, 2023, by the U.S. Patent and Trademark Office in U.S. Appl. No. 18/350,255.
Office Action issued on Aug. 22, 2023, by the Taiwan Intellectual Property Office in corresponding Taiwanese Patent Application No. 112103027, and an English Translation of the Office Action. (15 pages).
Li, J. X. et al. "Production and Heat Properties of an X-ray Reflective Anode Based on a Diamond Heat Buffer Layer," Materials, MDPI, Materials, vol. 13, No. 1, Jan. 6, 2020, pp. 241, 11 pages.
Office Action issued by the U.S. Patent and Trademark Office in the U.S. Appl. No. 18/350,361, mailed Sep. 11, 2023, U.S. Patent and Trademark Office, Alexandria, VA. (14 pages).
Office Action issued in Taiwanese Patent Application No. 112103029, dated Mar. 8, 2024 (4 pages).

* cited by examiner

INSPECTION APPARATUS AND INSPECTION METHOD

CROSS-REFERENCE TO RELATED APPLICATION(S)

This application is a continuation of International Patent Application No. PCT/JP2022/043905, filed on Nov. 29, 2022, which claims priority to and the benefit of Japanese Patent Application No. 2022-013653, filed on Jan. 31, 2022, the entire disclosures of which are incorporated herein by reference.

BACKGROUND OF THE INVENTION

Field of the Invention

The present invention relates to an inspection apparatus and an inspection method.

Description of the Related Art

Japanese Patent Laid-Open No. 2009-236622 describes a high-resolution X-ray microscope apparatus with an X-ray fluorescence analysis function, that includes a detector configured to detect fluorescent X-rays which are generated from a sample by focusing electron beams on an X-ray generation target by an object lens and irradiating the sample with X-rays generated from the target, and an analysis unit configured to analyze the fluorescent X-rays from the detection result of the detector. Japanese Patent Laid-Open No. 2009-236622 also describes an arrangement in which the whole detector or part of the detector is incorporated in the magnetic circuit of the object lens.

In recent years, for example, there has been a problem that a foreign substance having a size equal to or smaller than several ten μm is taken in a product to cause a defect. For example, in a lithium ion battery, with respect to a constituent member using carbon, copper, or aluminum as a material, a micronization of foreign substance of stainless steel or part of the constituent member may be taken in the battery at the time of manufacturing.

If, at the time of manufacturing a lithium ion battery, a foreign substance is taken in the battery, a separator for maintaining insulation in the battery may break due to a vibration of the foreign substance after shipping of the battery. In this case, the battery may be short-circuited to ignite or explode.

If a foreign substance can be detected nondestructively, it is possible to prevent distribution of a product that may ignite or explode. As a method of detecting a foreign substance existing on the surface of a sample using X-rays and specifying the element of the foreign substance, there are provided X-ray Fluorescence (to also be called XRF) and Grazing Incidence X-ray Fluorescence (to also be called TXRF). In X-ray Fluorescence, the element of a sample substrate is also excited. In Grazing Incidence X-ray Fluorescence, incident X-rays are scattered due to a foreign substance. Therefore, in these measurement methods, there is a problem that the intensity ratio of the generated fluorescent X-rays becomes low due to the foreign substance.

SUMMARY OF THE INVENTION

The present invention provides a technique advantageous in detecting a foreign substance existing on an inspection target surface with high sensitivity.

Solution to Problem

A first aspect of the present invention provides an inspection apparatus for inspecting an inspection target object, comprising: an X-ray generation tube having a target including an X-ray generation portion that generates X-rays by irradiation with an electron beam, and configured to emit X-rays to the inspection target object; and a plurality of X-ray detectors, wherein each of the plurality of X-ray detectors detects X-rays emitted from a foreign substance existing on an inspection target surface of the inspection target object irradiated with the X-rays from the X-ray generation portion and totally reflected by the inspection target surface.

A second aspect of the invention provides an inspection method of inspecting an inspection target object, comprising: an X-ray detection step of emitting X-rays to the inspection target object and detecting, by a plurality of X-ray detectors, X-rays emitted from a foreign substance existing on an inspection target surface of the inspection target object and totally reflected by the inspection target surface; and a processing step of processing outputs of the plurality of X-ray detectors.

DESCRIPTION OF EMBODIMENTS

Figure 1:
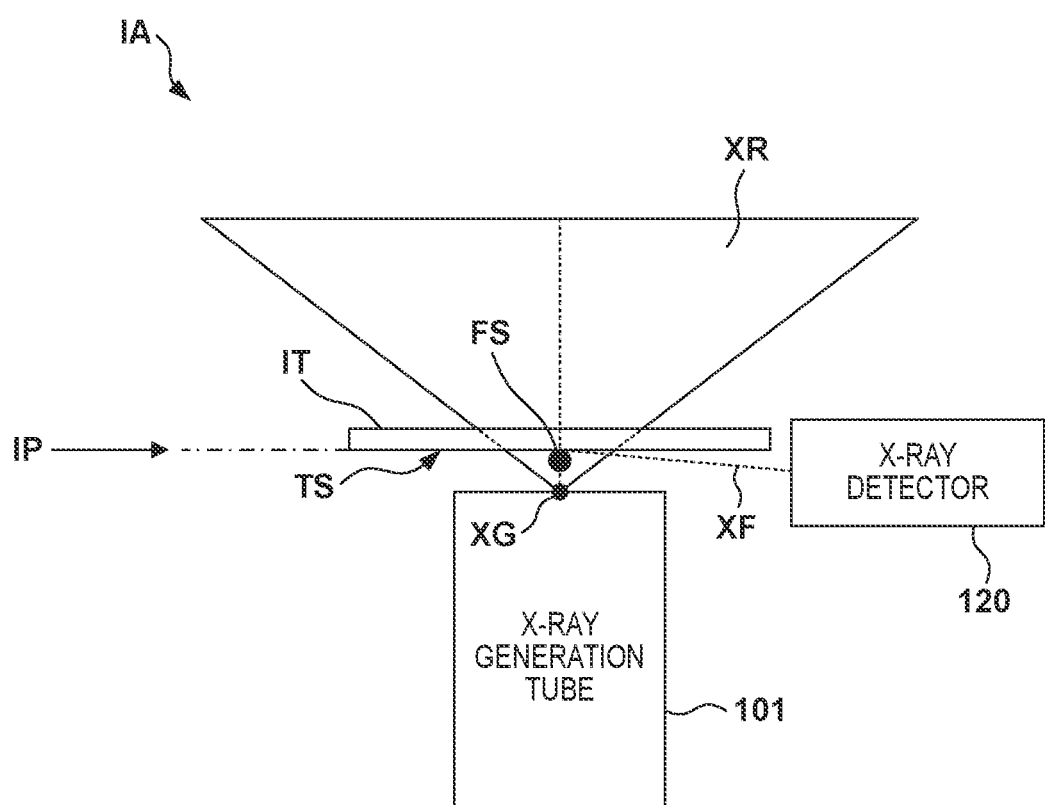
FIG. 1 is a view schematically showing the arrangement of an inspection apparatus according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached draw- FIG. 1 schematically shows the arrangement of an inspection apparatus IA according to the first embodiment of the present disclosure. The inspection apparatus IA can be formed as, for example, an inspection apparatus that inspects an inspection target surface TS arranged on an inspection plane IP. The inspection plane IP is a plane on which the inspection target surface TS should be arranged, and the inspection target surface TS is one surface of an inspection target object IT. The inspection apparatus IA can include an X-ray generation tube 101. The X-ray generation tube 101 has a target (not shown) including an X-ray generation portion XG that generates X-rays by irradiation with an electron beam, and emits X-rays XR to the inspection plane IP. A foreign substance FS irradiated with the X-rays XR from the X-ray generation portion XG generates X-rays corresponding to a material forming the foreign substance FS, and such X-rays are also called fluorescent X-rays or characteristic X-rays. Some of the X-rays generated by the foreign substance FS irradiated with the X-rays XR are totally reflected by the inspection target surface TS. The X-rays emitted from the foreign substance FS and totally reflected by the inspection target surface TS are represented as X-rays XF. The inspection apparatus IA can include an X-ray detector 120. The X-ray detector 120 can be configured to detect the X-rays XF emitted from the foreign substance FS existing on the inspection target surface TS irradiated with the X-rays XR from the X-ray generation portion XG and totally reflected by the inspection target surface TS. The inspection apparatus IA can further include a processor that performs processing of detecting the foreign substance FS based on an output from the X-ray detector 120. The processor can further perform processing of specifying the material forming the foreign substance FS based on the output from the X-ray detector 120. The processor can be implemented by, for example, a controller that controls the operation of the inspection apparatus IA.

Figure 2:
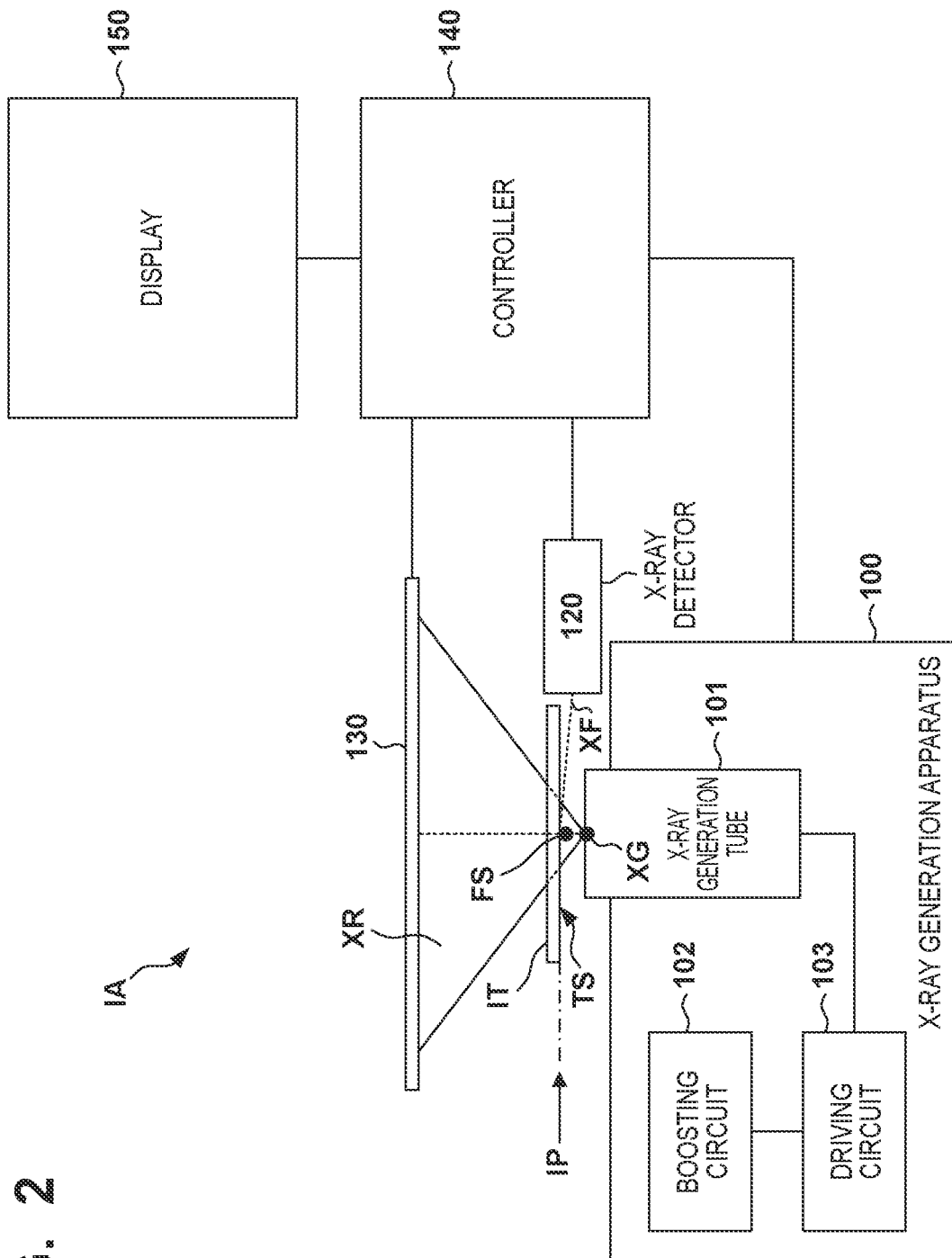
FIG. 2 is a view showing a practical example of the arrangement of the inspection apparatus according to the first embodiment.

FIG. 2 shows a practical example of the arrangement of the inspection apparatus IA shown in FIG. 1. The inspection apparatus IA can include an X-ray generation apparatus 100, the X-ray detector 120, and a controller 140. The X-ray generation apparatus 100 can include the X-ray generation tube 101 and a driving circuit 103 that drives the X-ray generation tube 101. The X-ray generation apparatus 100 can further include a boosting circuit 102 that supplies a boosted voltage to the driving circuit 103. The X-ray generation apparatus 100 can further include a storage container (not shown) that stores the X-ray generation tube 101, the driving circuit 103, and the boosting circuit 102, and the storage container can be filled with an insulating fluid such as insulating oil. The controller 140 can be configured to control the X-ray generation apparatus 100 and the X-ray detector 120. The controller 140 can have the function of the above-described processor. More specifically, the controller 140 can perform processing of detecting the foreign substance FS based on the output from the X-ray detector 120. Furthermore, the controller 140 can perform processing of specifying the material forming the foreign substance FS based on the output from the X-ray detector 120. The controller 140 can be formed by, for example, a PLD (an abbreviation of Programmable Logic Device) such as an FPGA (an abbreviation of Field Programmable Gate Array), an ASIC (an abbreviation of Application Specific Integrated Circuit), a general-purpose or dedicated computer installed with a program, or a combination of all or some of these components.

The inspection apparatus IA may further include an X-ray detection panel 130 that detects X-rays emitted from the X-ray generation portion XG and transmitted through the inspection target object IT having the inspection target surface TS. The controller 140 can be configured to generate an image (a transmission image of the inspection target object IT) of the X-rays transmitted through the inspection target object IT based on an output from the X-ray detection panel 130 and detect the foreign substance FS existing on the inspection target surface TS based on the image. It is possible to detect a foreign substance existing inside the inspection target object IT and a foreign substance existing on a surface on the opposite side of the inspection target surface TS using the X-ray detection panel 130. The controller 140 can be configured to detect the existence of the foreign substance FS and also detect the position and/or size of the foreign substance FS. By providing the X-ray detection panel 130 in addition to the X-ray detector 120, the foreign substance FS that cannot be detected by the X-ray detector 120 can be detected by the X-ray detection panel 130, thereby making it possible to improve the accuracy of detection of the foreign substance FS. As compared with a system including two apparatuses that acquire a transmission image and detect a foreign substance, respectively, the inspection apparatus IA that acquires a transmission image and detects a foreign substance using X-rays emitted from one X-ray generation tube is advantageous in reducing the size and the cost.

The inspection apparatus IA may further include a display 150, and the controller 140 can be configured to display, on the display 150, information indicating the constituent material of the foreign substance FS specified based on the output from the X-ray detector 120. The controller 140 can further be configured to display, on the display 150, the transmission image of the inspection target object IT generated based on the output from the X-ray detection panel 130. In addition, the controller 140 can be configured to display, on the display 150, information indicating the position and/or size of the foreign substance detected based on the output from the X-ray detection panel 130. The controller 140 may be formed by a single unit or may be divided into a plurality of units.

Figure 3:
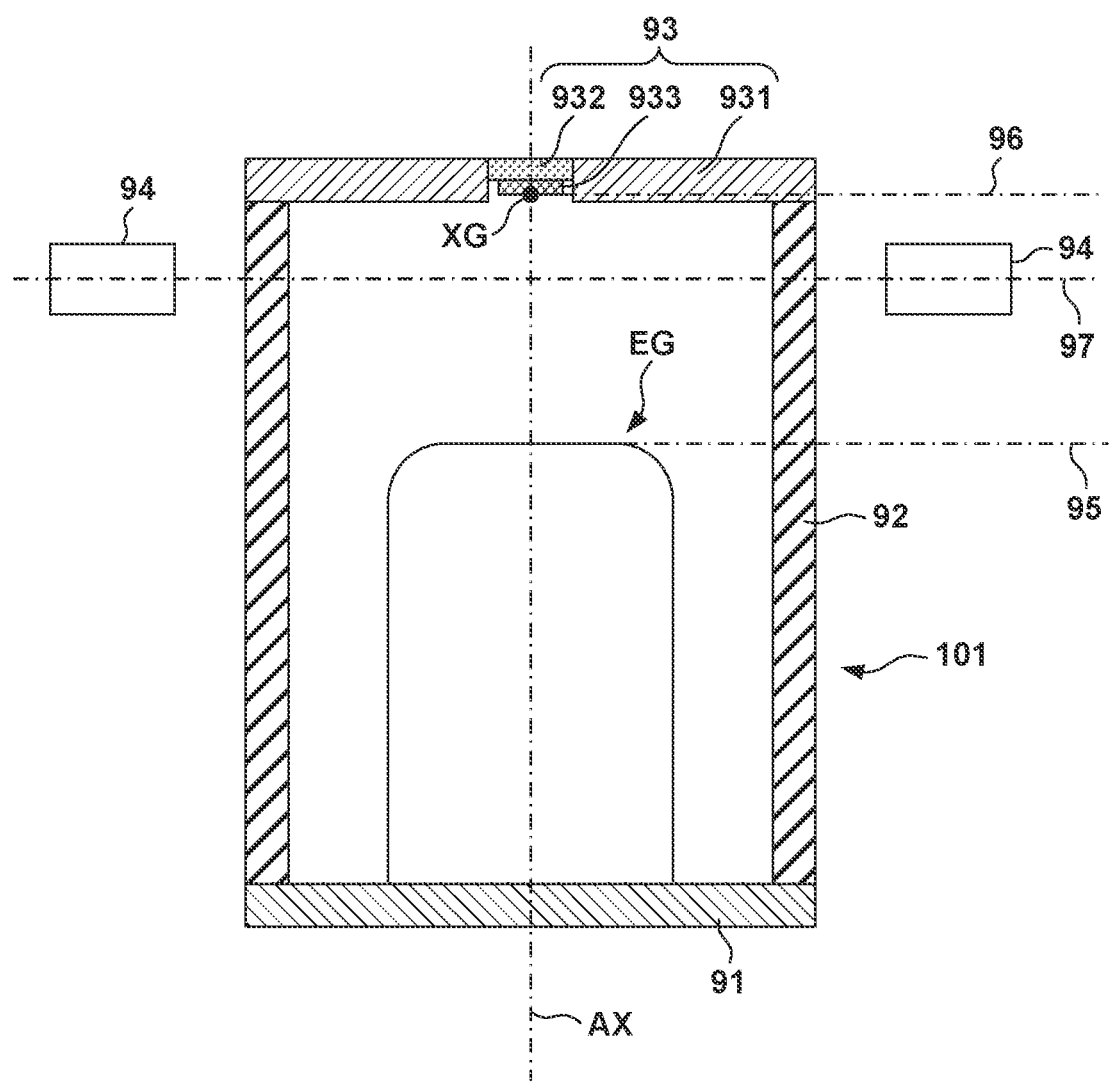
FIG. 3 is a view schematically showing an example of the arrangement of an X-ray generation tube.

FIG. 3 schematically shows an example of the arrangement of the X-ray generation tube 101. The X-ray generation tube 101 can include an electron gun EG, an anode 93 having a target 933 including the X-ray generation portion XG that generates X-rays when electrons from the electron gun EG collide, and an insulating tube 92. In the X-ray generation tube 101, the anode 93 can be arranged to close one of the two opening ends of the insulating tube 92, and a closing member 91 including the electron gun EG can be arranged to close the other of the two opening ends of the insulating tube 92. A deflector 94 that deflects the flow (electron beam) of electrons from the electron gun EG may be arranged outside the insulating tube 92. The X-ray generation tube 101 shown in FIG. 3 is an example of a sealed transmission type X-ray generation tube in which the internal space of the insulating tube 92 is maintained in a vacuum state and X-rays are transmitted through the target 933 and a target holding plate 932 (to be described later). However, as the X-ray generation tube 101, an unsealed open type or non-transmission reflection type X-ray generation tube may be adopted.

The deflector 94 can be arranged outside the X-ray generation tube 101. With respect to a direction parallel to an axis AX of the X-ray generation tube 101, the deflector 94 can be provided between the anode 93 and a cathode (not shown). In an example, with respect to the direction parallel to the axis AX of the X-ray generation tube 101, the deflector 94 is provided between the electron gun EG and the target 933. More specifically, a virtual plane 97 crossing the deflector 94 can be located in a space sandwiched between a virtual plane 95 contacting the distal end of the electron gun EG and a virtual plane 96 contacting part of the target 933. The virtual planes 95, 96, and 97 are planes orthogonal to the axis AX of the X-ray generation tube 101.

The anode 93 can include the target 933, the target holding plate 932 that holds the target 933, and an electrode 931 that holds the target holding plate 932. The electrode 931 is electrically connected to the target 933 and can give a potential to the target 933. The target 933 generates X-rays when electrons (electron beam) emitted from the electron gun EG collide against the target 933. The X-ray generation portion XG is a portion of the surface of the target 933, against which the electrons (electron beam) collide. The X-rays generated by the X-ray generation portion XG are transmitted through the target holding plate 932 and emitted to the outside of the X-ray generation tube 101. The anode 93 can be maintained at, for example, the ground potential but may be maintained at another potential.

The target 933 is made of a metal material. The target 933 is desirably made of a material having a high melting point, for example, tungsten, tantalum, molybdenum, or the like, which contributes to improvement of X-ray generation efficiency. The target holding plate 932 can be made of a material that readily passes X-rays, for example, beryllium, diamond, or the like. The target holding plate 932 is desirably made of diamond. This can decrease the thickness of the target holding plate 932 while maintaining the strength of the target holding plate 932, and can decrease the distance between the inspection plane IP (inspection target surface TS) and the target 933 (X-ray generation portion XG). The thickness of the target holding plate 932 is desirably thin. More specifically, the thickness of the target holding plate 932 is desirably 4 mm or less, and more desirably 2 mm or less, 1 mm or less, or 0.3 mm or less. The thickness of the target holding plate 932 can be set with reference to the distance from the X-ray generation portion XG to the inspection plane IP, which is necessary to specify an element contained in the foreign substance (to be described later). To specify the element contained in the foreign substance, the target holding plate 932 is desirably, extremely thin. However, the target holding plate 932 is desirably thick in terms of the processing cost and the individual difference of the target holding plate 932, strength for maintaining the internal space of the insulating tube 92 in the vacuum state, and the like. Therefore, the optimum thickness of the target holding plate 932 is desirably used. Note that FIG. 3 is not intended to show the relationship between the thickness of the target 933 and that of the target holding plate 932. For example, the thickness of the target 933 may be several μm, and the thickness of the target holding plate 932 may be several hundred μm.

Figure 4:
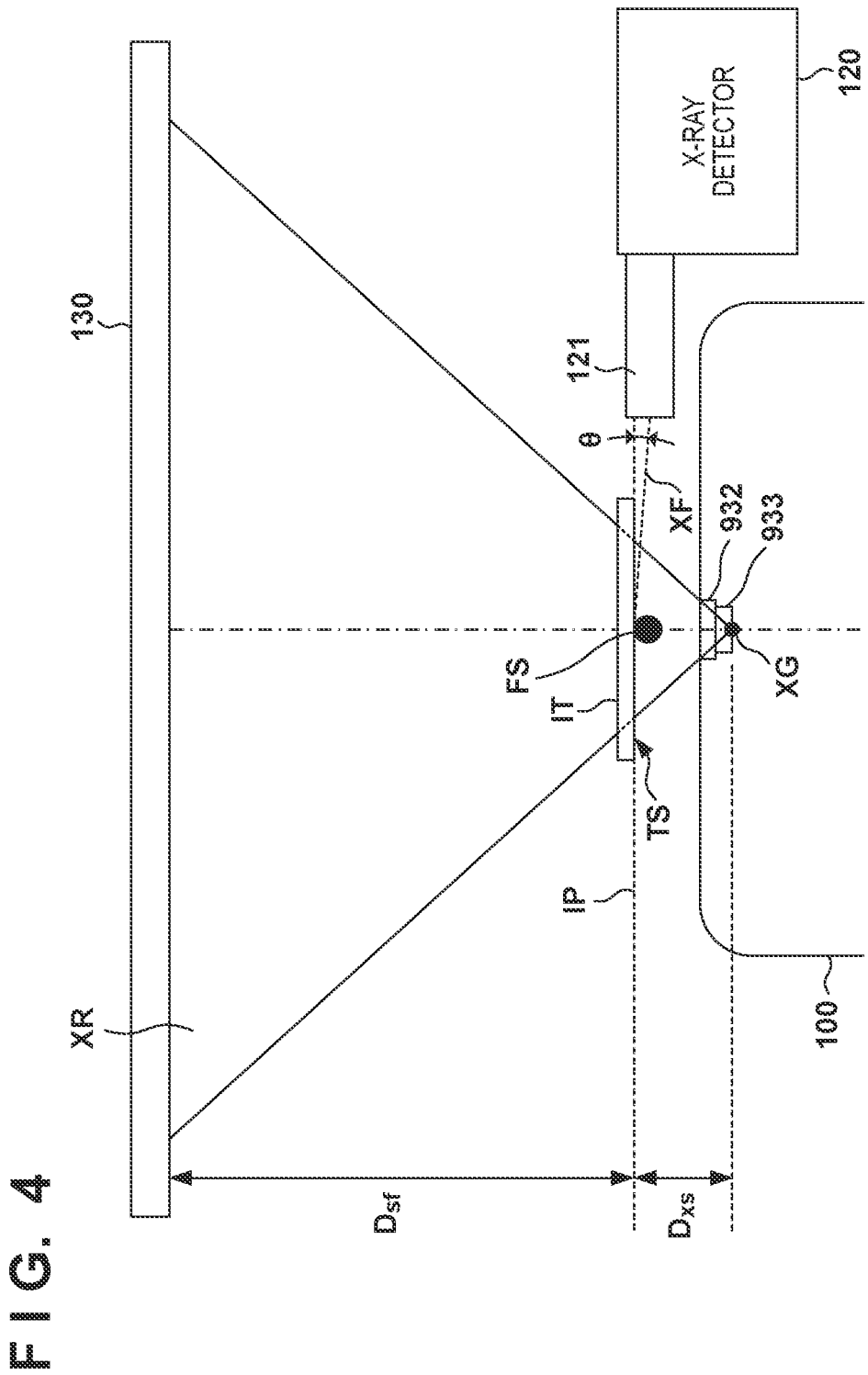
FIG. 4 is an enlarged schematic view of part of the inspection apparatus shown in FIG. 2.

FIG. 4 is an enlarged schematic view of part of the inspection apparatus IA shown in FIG. 2. The foreign substance FS can exist on the inspection target surface TS. The X-rays (characteristic X-rays) XF that are emitted from the foreign substance FS so as to be totally reflected by the inspection target surface TS and are totally reflected by the inspection target surface TS enter an X-ray receiving portion 121 of the X-ray detector 120. On the other hand, fluorescent X-rays that can be generated from the inspection target object IT by irradiation with the X-rays XR from the X-ray generation portion XG hardly enter the X-ray receiving portion 121 of the X-ray detector 120 arranged to detect the X-rays (characteristic X-rays) XF. Therefore, the ratio of the fluorescent X-rays emitted from the inspection target object IT and detected by the X-ray detector 120 with respect to the X-rays (characteristic X-rays) XF emitted from the foreign substance FS and detected by the X-ray detector 120 can be made extremely low.

The X-ray detector 120 may be a silicon drift detector (SDD), a CdTe detector, or a CdZnTe detector. The X-ray detector 120 may be an energy dispersion detector. If the X-ray detector 120 is an energy dispersion detector, the controller (or processor) 140 can decide the material or element forming the foreign substance FS based on the elemental profile of energy dispersion (a count value for each energy). Commercial software may be installed on the controller (or processor) 140 to decide the material or element forming the foreign substance FS. Examples of such software are, for example, "XRS-FP Quantitative XRF Analysis Software" of AMETEK or UniQuant software.

The specifications of the X-ray detector 120 can be decided in accordance with an energy resolution necessary to detect a foreign substance. An example of a detector having a low energy resolution can be a detector using a scintillator, an Si PIN photodiode, or a CCD. An example of a detector having an even higher energy resolution can be a detector using a proportional counter. An example of a detector having an even higher energy resolution can be a detector applied with a CdTe direct-bandgap crystal or an energy dispersion detection method like an Si drift detector. An example of a detector having an even higher energy resolution can be a detector applied with a wavelength dispersion detection method of obtaining energy from an angle using an analyzing crystal.

To totally reflect, by the inspection target surface TS, the fluorescent X-rays from the foreign substance FS, an angle at which the fluorescent X-rays from the foreign substance FS enter the inspection target surface TS needs to be a total reflection critical angle $\theta_c$ or less.

$$\delta = \left(\frac{r_e \lambda^2}{2\pi}\right) N_0 \rho \sum_i x_i(z_i + f'_i) / \sum_i x_i M_i \quad (1)$$

$$\theta_c \approx \sqrt{2\delta}$$

$\theta_c$: total reflection critical angle
$r_e$: classical electron radius (2.818×10$^{-15}$ m)
$N_0$: Avogadro number
$\lambda$: X-ray wavelength
$\rho$: density (g/cm$^3$)
Zi, Mi, xi: atomic number, atomic weight, and atomic ratio (molar ratio) of ith atom
$f_i$: atomic scattering factor (anomalous dispersion term) of ith atom If the inspection target surface TS is made of a metal, the total reflection critical angle is theoretically about 1° or less. However, in fact, the metal surface is often oxidized or carbonized, or a reflection critical angle different from the theoretical value is often obtained because, for example, the surface is covered with a graphite layer. If a total reflection condition is satisfied when the inspection target surface TS is irradiated with the X-rays XR, an angle (total reflection critical angle) formed by the inspection target surface TS and the characteristic X-rays emitted from the foreign substance FS and totally reflected by the inspection target surface TS is confirmed to be 5° or less through an experiment. At this time, since the foreign substance FS is extremely small as compared with a distance $D_{xs}$ between the X-ray generation portion XG and the inspection plane IP (inspection target surface TS), a position at which the X-rays emitted from the foreign substance FS are totally reflected by the inspection target surface TS may be regarded as a position at which the X-rays XR from the X-ray generation portion XG enter the inspection plane IP. If the foreign substance FS exists at a position where the X-rays XR from the X-ray generation portion XG vertically enter the inspection plane IP, as shown in FIG. 4, the position at which the X-rays emitted from the foreign substance FS are totally reflected by the inspection target surface TS may be regarded as the position at which the X-rays XR from the X-ray generation portion XG vertically enter the inspection plane IP.

Since the total reflection critical angle is 5° or less, an angle θ formed by the inspection plane IP and a virtual line connecting the X-ray receiving portion 121 of the X-ray detector 120 and the position at which the X-rays XR from the X-ray generation portion XG enter the inspection plane IP (an angle formed by the inspection plane IP and a virtual line connecting the center of the X-ray receiving portion of the X-ray detector 120 and the intersection point of the inspection plane IP and the axis of the X-ray generation tube 101) can be set to 5° or less, desirably 2° or less, and more desirably 1° or less. As the angle θ is smaller, the ratio of the fluorescent X-rays emitted from the inspection target object IT and detected by the X-ray detector 120 with respect to the X-rays (characteristic X-rays) XF emitted from the foreign substance FS and detected by the X-ray detector 120 can be made lower.

Figure 5:
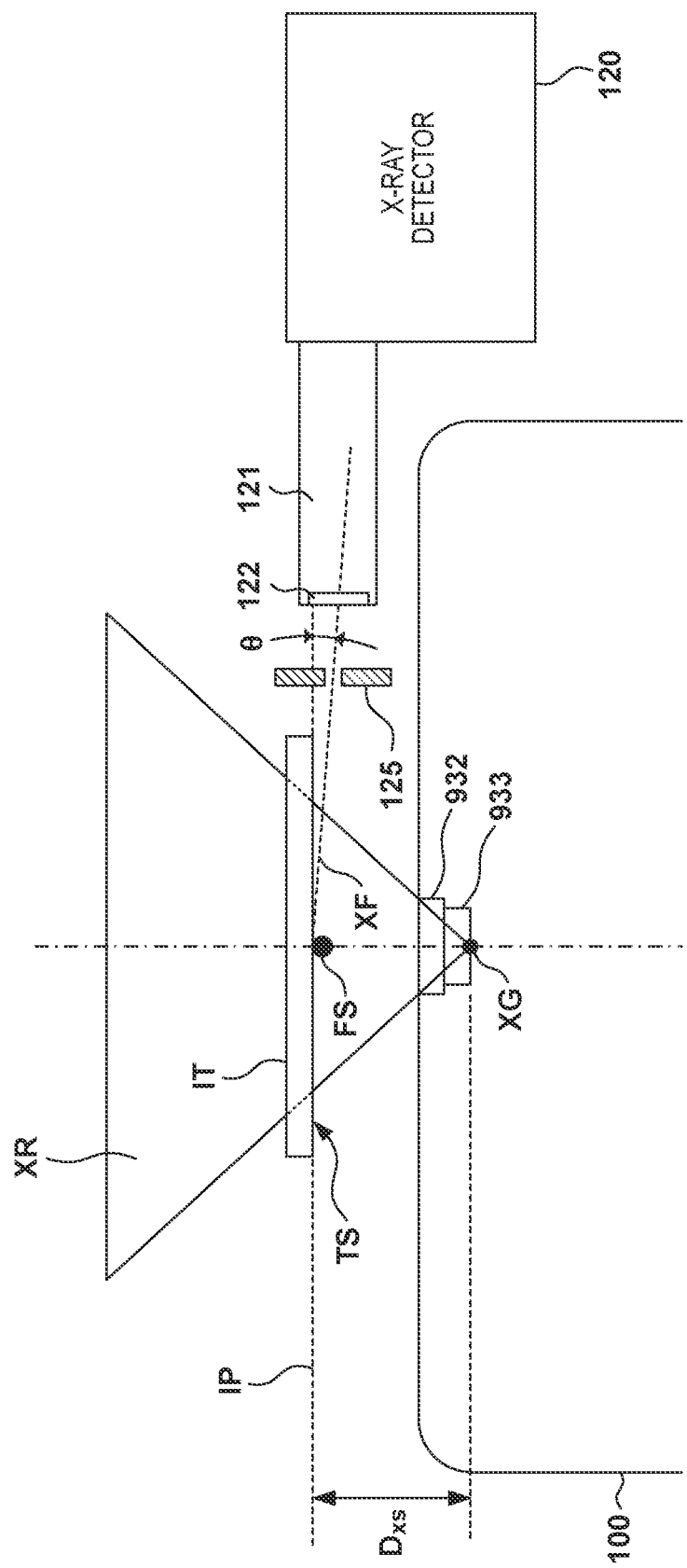
FIG. 5 is an enlarged schematic view of part of the inspection apparatus shown in FIG. 2.
Figure 7:
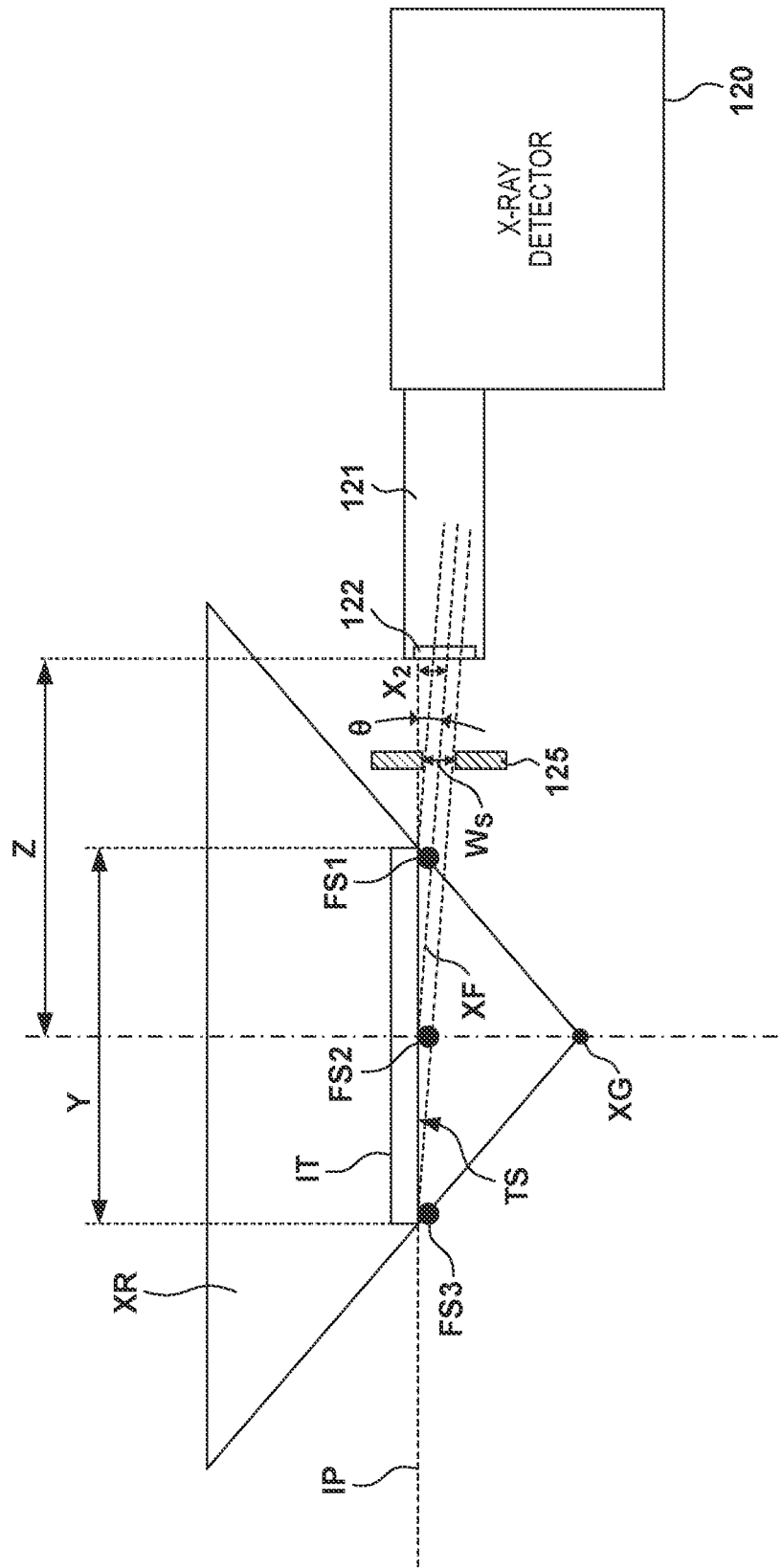
FIG. 7 is a view showing a practical example of the arrangement of the inspection apparatus according to the embodiment.

The X-ray detector 120 can be arranged at a position where the extension plane of the inspection plane IP crosses the X-ray detector 120. As schematically shown in FIG. 5, the X-ray receiving portion 121 can include a window portion 122 that passes the X-rays XF. The window portion 122 can have, for example, a diameter of several mm and a thickness of several hundred μm. The window portion 122 can be made of, for example, beryllium. As schematically shown in FIG. 5, the inspection apparatus IA may include a slit member 125 having a slit (opening) on a virtual line connecting the X-ray receiving portion 121 of the X-ray detector 120 and the position at which the X-rays XR from the X-ray generation portion XG enter the inspection plane IP. The size of the slit provided in the slit member 125 and the arrangement position of the X-ray detector 120 can be decided in accordance with a range irradiated with the X-rays XR on the inspection target surface TS, the materials that can form the inspection target surface TS and the foreign substance FS, and the like. Consider a case in which foreign substances FS1 and FS3 exist at two ends of a width Y irradiated with the X-rays XR on the inspection target surface TS, and a distance Z from the center of the width Y to the X-ray receiving portion 121 has the same length as that of the width Y, as schematically shown in FIG. 7. In this case, by setting the lower limit of a width $W_s$ of the slit to Y×tan θ, and setting a distance $X_2$ between the center of the X-ray receiving portion 121 and the inspection plane IP to Y×tan θ, it is possible to detect all foreign substances within the range irradiated with the X-rays XR on the inspection target surface TS.

Figure 6:
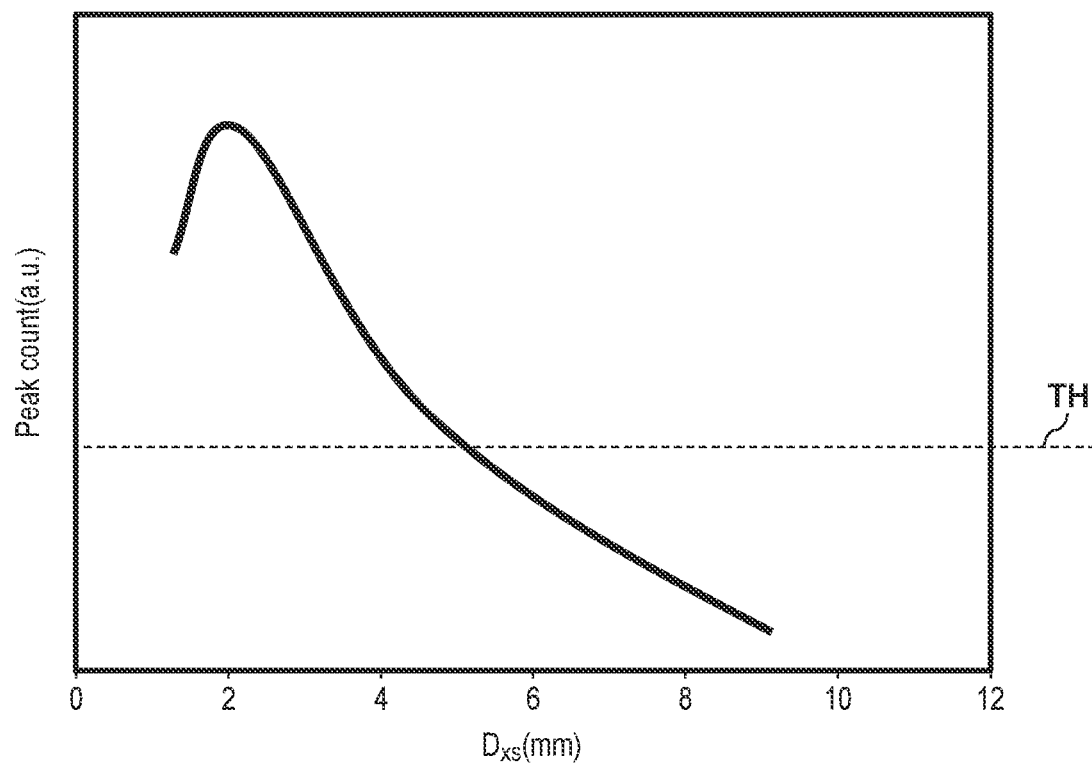
FIG. 6 is a graph exemplifying the relationship between a distance $D_{xs}$ (abscissa) and the count (ordinate) of foreign substances detected by an X-ray detector.

To increase the intensity of the X-rays XF detected by the X-ray detector 120, the distance $D_{xs}$ from the X-ray generation portion XG to the inspection plane IP is desirably made small. FIG. 6 shows a result of obtaining, by an experiment, the relationship between the distance $D_{xs}$ (abscissa) and the count (ordinate) of foreign substances detected by the X-ray detector 120. The count is a total count (peak count), per predetermined time, of energy corresponding to the position of fluorescent X-rays (for example, Ni Kα-rays) exiting from a specific element contained in the foreign substance. Considering a count TH necessary to specify the element, the distance $D_{xs}$ from the X-ray generation portion XG to the inspection plane IP is desirably 5 mm or less, more desirably 4 mm or less, and still more desirably 3 mm or less. As the X-ray generation tube 101, for example, a sealed transmission microfocus X-ray source of Canon ANELVA, more specifically, the G series, and still more specifically, the G-511 series or G-311 series is useful.

To detect, by a transmission image, a foreign substance having a size of several μm to several tens of μm with high sensitivity, a distance $D_{sf}$ from the inspection plane IP to the X-ray detection panel 130 needs to be made sufficiently larger than $D_{xs}$. For example, if 10 pixels are necessary to detect a foreign substance having a diameter of 5 μm, when an X-ray detection panel (FPD) having a pixel pitch of 100 μm is used, a magnification ratio of 100×10/5=200 is required for detection. As for a foreign substance having a diameter of 50 μm, a magnification ratio of 20 is required for detection. Therefore, $D_{sf}/D_{xs}$ is set to desirably 20 or more, and more desirably 200 or more. This can detect a foreign substance with high sensitivity using a transmission image.

The inspection apparatus IA is useful to detect a foreign substance attached to a material of a lithium ion battery in a manufacturing step of the lithium ion battery, but is merely an example and is also useful for other application purposes. For example, the inspection apparatus IA may be used to measure and analyze airborne particles such as PM2.5 influencing the environment and health. In this case, by using the inspection apparatus IA for the conventional technique of periodically (for example, every hour or every day) measuring the number of particles and the sizes of the particles, it is possible to simultaneously specify materials or elements forming the particles in addition to measurement of the number of particles and the sizes of the particles, thereby implementing more advanced environmental and health measures. Alternatively, by using the inspection apparatus IA for the field of semiconductors, micronization of which has recently been advanced, such as an "EUV mask manufacturing apparatus, an inspection apparatus, and an inspection apparatus of a semiconductor manufacturing step, it is possible to improve a yield and early solve the cause of an abnormality using the element information of a foreign substance.

An inspection method of inspecting the inspection target surface TS arranged on the inspection plane IP using the inspection apparatus IA will be described below. The inspection method can include an X-ray detection step of emitting X-rays to the inspection plane IP (inspection target surface TS) and detecting, by the X-ray detector 120, the X-rays XF emitted from the foreign substance FS existing on the inspection target surface TS and totally reflected by the inspection target surface TS, and a processing step of processing an output of the X-ray detector 120. The processing step can include a step of detecting the foreign substance FS and/or a step of specifying a material forming the foreign substance FS. The inspection method can further include a step of detecting, by the X-ray detection panel 130, X-rays transmitted through the inspection target object IT having the inspection target surface TS, and in the processing step, the output of the X-ray detector 120 and an output of the X-ray detection panel 130 can be processed. The processing step can include a step of detecting the existence of the foreign substance FS and the position of the foreign substance FS based on the output of the X-ray detection panel 130. Alternatively, the processing step can include a step of detecting the existence of the foreign substance FS, the position of the foreign substance FS, and the size of the foreign substance FS based on the output of the X-ray detection panel 130.

Figure 8:
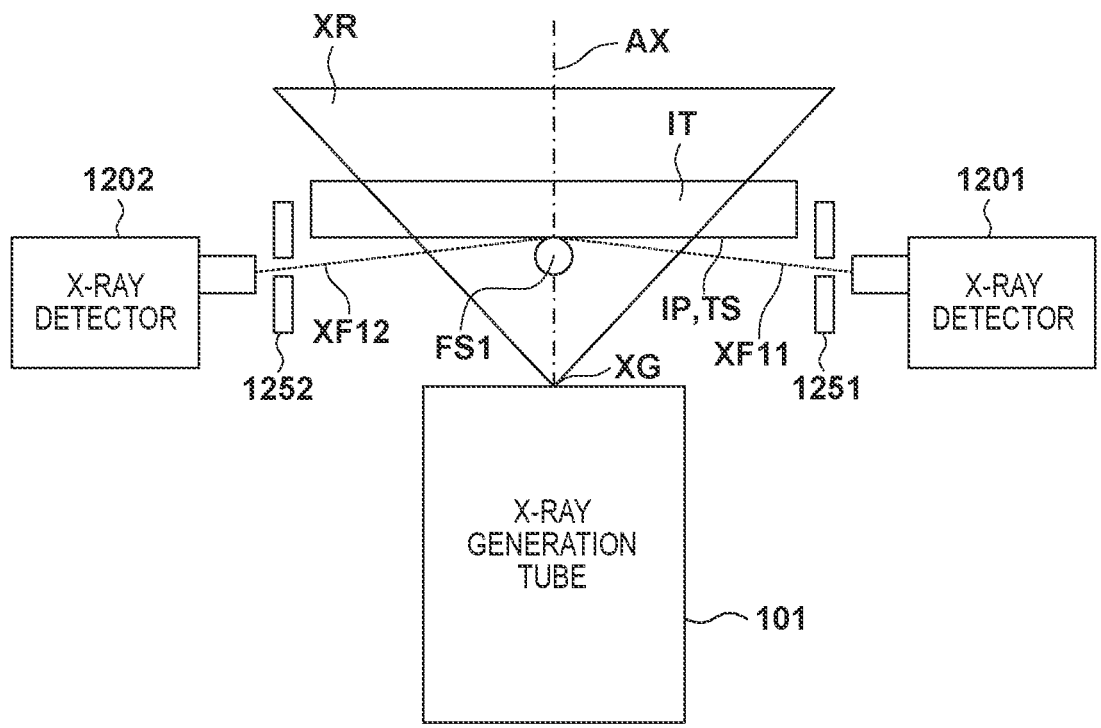
FIG. 8 is a view schematically showing the arrangement of an inspection apparatus according to the second embodiment.

FIG. 8 schematically shows the arrangement of an inspection apparatus IA according to the second embodiment. Matters not mentioned in the second embodiment can comply with the first embodiment. The inspection apparatus IA according to the second embodiment is configured to inspect an inspection target object IT. The inspection apparatus IA includes an X-ray generation tube 101, and the X-ray generation tube 101 has a target including an X-ray generation portion XG that generates X-rays by irradiation with an electron beam, and emits X-rays XR to the inspection target object IT. The inspection apparatus IA can include a plurality of X-ray detectors. Each of the X-ray detectors detects X-rays emitted from a foreign substance FS1 existing on an inspection target surface TS of the inspection target object IT irradiated with the X-rays from the X-ray generation portion and totally reflected by the inspection target surface TS.

The inspection apparatus IA can include, for example, a first X-ray detector 1201 and a second X-ray detector 1202 as the plurality of X-ray detectors. The first X-ray detector 1201 and the second X-ray detector 1202 can be arranged to face each other via an axis AX of the X-ray generation tube 101. From another viewpoint, the first X-ray detector 1201 and the second X-ray detector 1202 can be arranged to face each other. The inspection apparatus IA according to the second embodiment can include slit members 1251 and 1252 similar to the slit member 125 in the inspection apparatus IA of the first embodiment. The slit members 1251 and 1252 can be provided for the first X-ray detector 1201 and the second X-ray detector 1202, respectively. The X-ray generation portion XG emits X-rays radially (for example, in all directions of 360°), and some of the X-rays can totally be reflected by the inspection target surface TS. The X-rays totally reflected by the inspection target surface TS include, for example, X-rays XF11 entering the first X-ray detector 1201 and X-rays XF12 entering the second X-ray detector 1202. The X-rays XF11 and XF12 shown in FIG. 8 can be understood as trajectory vectors of X-ray photons. Another foreign substance can exist on the inspection target surface TS in addition to the foreign substance FS1. Therefore, the X-rays emitted from the foreign substance FS1 and totally reflected by the inspection target surface TS may be blocked by the other foreign substance and may not enter at least one of the plurality of X-ray detectors. However, by arranging the plurality of X-ray detectors, the possibility that one of the plurality of X-ray detectors can detect the X-rays emitted from the foreign substance FS1 and totally reflected by the inspection target surface TS becomes higher.

Figure 9:
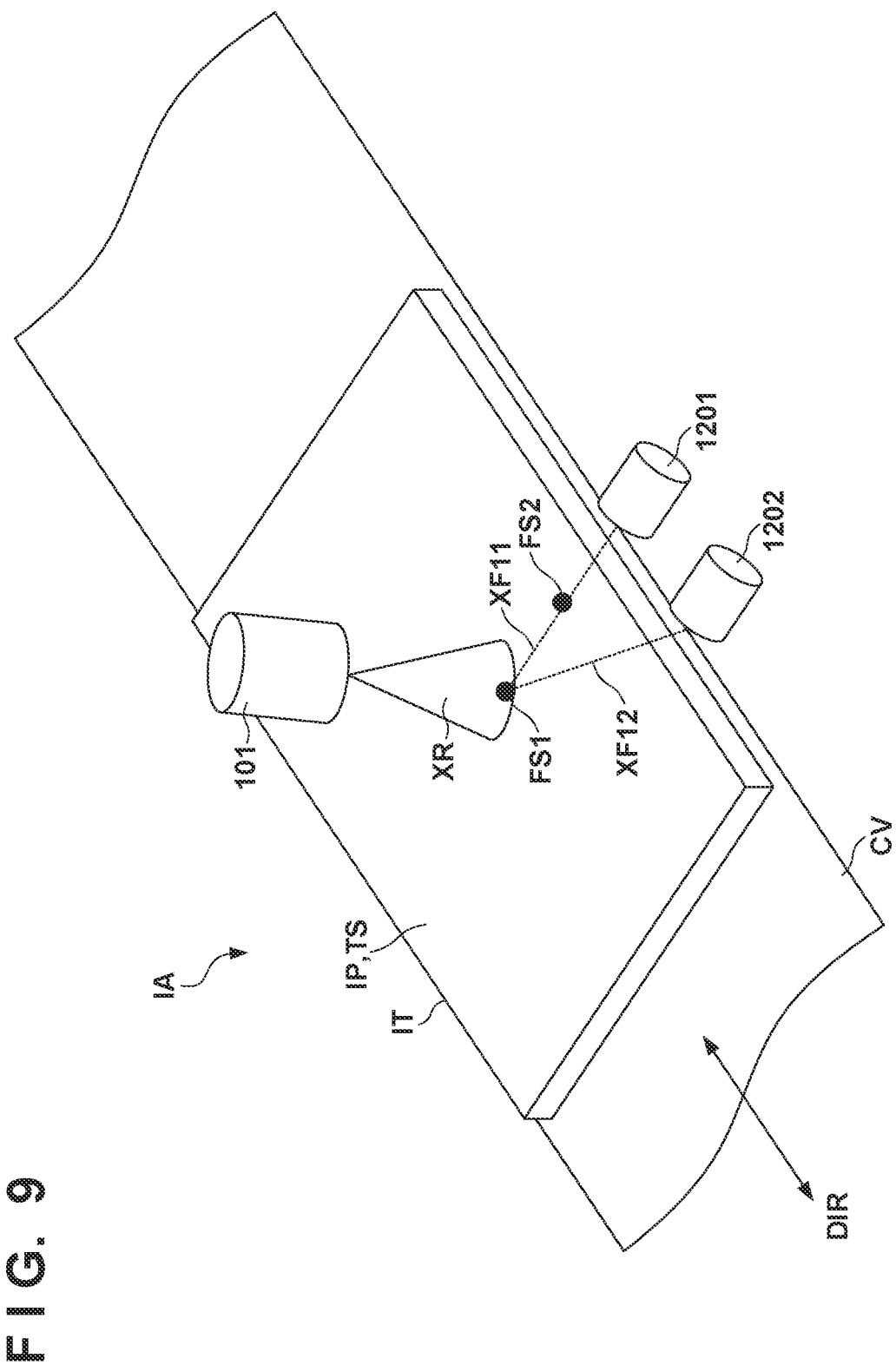
FIG. 9 is a view schematically showing the arrangement of an inspection apparatus according to the third embodiment.

FIG. 9 schematically shows the arrangement of an inspection apparatus IA according to the third embodiment. FIG. 9 is a view of the inspection apparatus IA when viewed from an oblique direction. Matters not mentioned in the third embodiment can comply with the second embodiment described with reference to FIG. 8. FIG. 9 does not illustrate a slit member but a slit member may be provided, similar to the second embodiment. The inspection apparatus IA can include a conveyance mechanism CV that conveys an inspection target object IT along a conveyance direction DIR.

A first X-ray detector 1201 and a second X-ray detector 1202 can be arranged at positions apart from each other in a direction parallel to the conveyance direction DIR or a direction parallel to the longitudinal direction of the inspection target object IT. FIG. 9 shows X-rays XF11 (a trajectory vector of X-ray photons) and X-rays XF12 (a trajectory vector of X-ray photons) emitted from a foreign substance FS1 irradiated with X-rays XR from an X-ray generation portion XG and totally reflected by an inspection target surface TS. The X-rays XF11 enter the first X-ray detector 1201 and the X-rays XF12 enter the second X-ray detector 1202.

A foreign substance FS2 different from the foreign substance FS1 can exist on the inspection target surface TS. In the example shown in FIG. 9, the foreign substance FS2 exists between the foreign substance FS1 and the first X-ray detector 1201. If the X-rays XF11 are blocked by the foreign substance FS2, the first X-ray detector 1201 cannot detect the X-rays XF11. However, the second X-ray detector 1202 can detect the X-rays XF12 from the foreign substance FS1. This can reduce the possibility that the foreign substance on the inspection target surface TS of the inspection target object IT is missed, thereby preventing the manufacturing yield from lowering. Furthermore, based on the positional relationship between the second X-ray detector 1202 that has detected the foreign substance and the first X-ray detector 1201 that cannot detect the foreign substance, the position of the foreign substance can be estimated. For example, in the example shown in FIG. 9, it can be estimated that the foreign substance FS2 exists between the foreign substance FS1 and the second X-ray detector 1202.

The inspection apparatus IA may include an additional X-ray detector that is arranged to detect X-rays totally reflected by a foreign substance existing on a surface on the opposite side of the inspection target surface TS.

Figure 10:
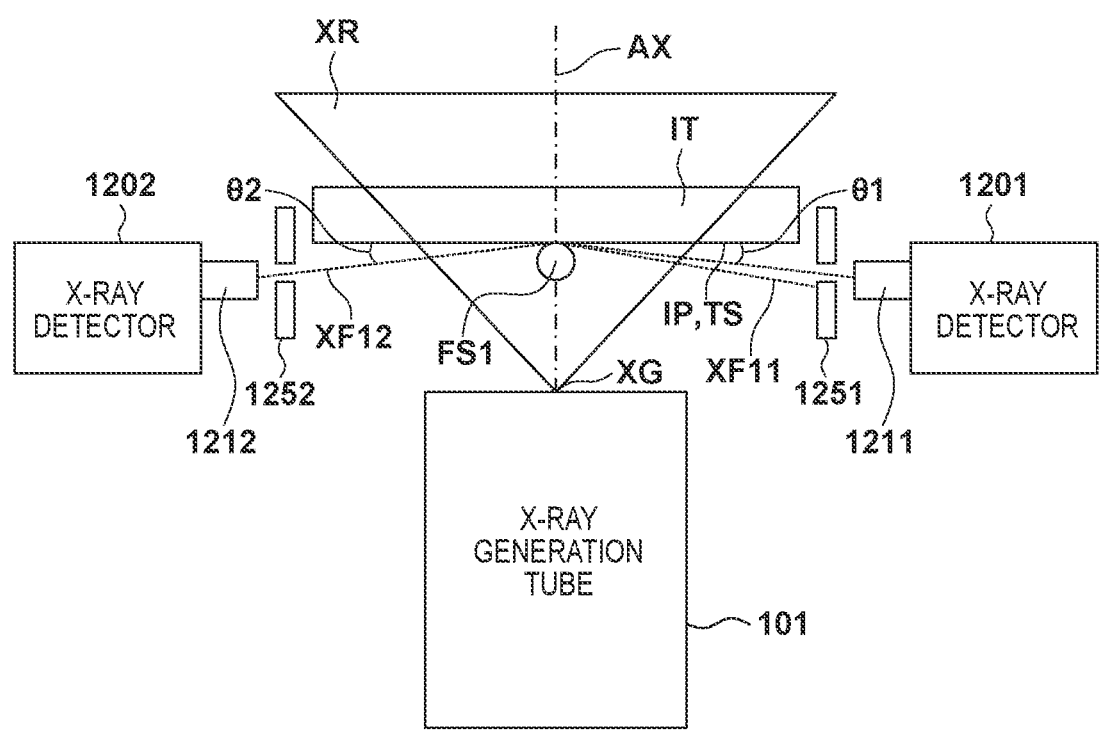
FIG. 10 is a view schematically showing the arrangement of an inspection apparatus according to the fourth embodiment.

FIG. 10 schematically shows the arrangement of an inspection apparatus IA according to the fourth embodiment. Matters not mentioned in the fourth embodiment can comply with the second or third embodiment. The inspection apparatus IA can include a plurality of X-ray detectors. A first X-ray detector 1201 and a second X-ray detector 1202 as the plurality of X-ray detectors include X-ray receiving portions 1211 and 1212, respectively. An angle formed by an inspection plane IP and a virtual line connecting the center of the X-ray receiving portion 1211 and the intersection point of the inspection plane IP and an axis AX of an X-ray generation tube 101 is represented by $\theta 1$. An angle formed by the inspection plane IP and a virtual line connecting the center of the X-ray receiving portion 1212 and the intersection point of the inspection plane IP and the axis AX of the X-ray generation tube 101 is represented by $\theta 2$. The angles $\theta 1$ and $\theta 2$ are preferably 5° or less, and more preferably 2° or less.

The angles $\theta 1$ and $\theta 2$ may be the same or different from each other. In an arrangement in which the angles $\theta 1$ and $\theta 2$ are different from each other, even in a case where the first detector 1201 cannot detect X-rays XF11 emitted from a foreign substance FS1 and totally reflected by an inspection target surface TS, the second detector 1202 may be able to detect X-rays XF12 emitted from the foreign substance FS1 and totally reflected by the inspection target surface TS. The arrangement in which the angles $\theta 1$ and $\theta 2$ are different from each other can be understood as an arrangement in which the distance between the inspection plane IP and the first X-ray receiving portion 1211 is different from the distance between the inspection plane IP and the second X-ray receiving portion 1212. This arrangement is advantageous in detecting various foreign substances having different characteristics, and is also advantageous in processing the inspection target surface TS having various characteristics.

The second to fourth embodiments are advantageous in a case where a plurality of foreign substances exist on the same inspection target surface and a case where a foreign substance different from an expected one exists on the inspection target surface, and is also advantageous in improving the detection accuracy of a foreign substance. For example, in a case where an inspection speed is improved or a case where a foreign substance on the inspection target surface is inspected during conveyance of the inspection target object, an amount of detected fluorescent X-rays may be limited and it may be impossible to obtain sufficient foreign substance detection accuracy or foreign substance identification accuracy. However, this problem can be solved or reduced by providing a plurality of detectors, like in the second to fourth embodiments. For example, when a controller 140 processes a count value (output) for each energy of fluorescent X-rays from a foreign substance obtained by each of the plurality of detectors, it is possible to improve the foreign substance detection/identification accuracy. For example, it is possible to perform a determination step by an average value obtained by averaging processing for the count values for the energies, or a determination step by variation processing for the count values for the energies. It can be said that the foreign substance detection/identification accuracy can be improved by comparing outputs of the plurality of detectors by the controller 140. In addition, in a case where the position of the inspection target surface is different due to a vibration or a difference in thickness of the inspection target object, the use of the inspection apparatus according to the fourth embodiment produces an effect of improving the foreign substance detection/identification accuracy.

Figure 11:
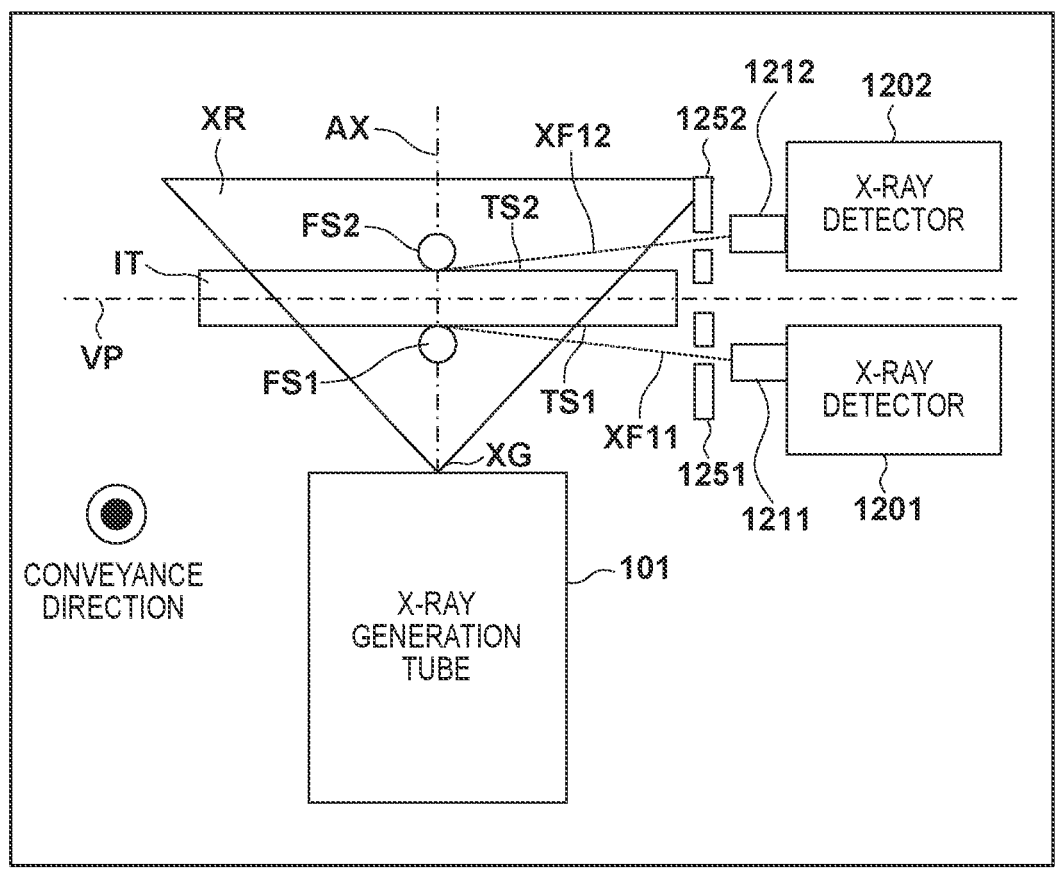
FIG. 11 is a view schematically showing the arrangement of an inspection apparatus according to the fifth embodiment.

FIG. 11 schematically shows the arrangement of an inspection apparatus IA according to the fifth embodiment. Matters not mentioned in the fifth embodiment can comply with the first to fourth embodiments. The inspection apparatus IA according to the fifth embodiment is configured to inspect an inspection target object IT. The inspection apparatus IA includes an X-ray generation tube 101, and the X-ray generation tube 101 has a target including an X-ray generation portion XG that generates X-rays by irradiation with an electron beam, and emits X-rays XR to the inspection target object IT. The inspection apparatus IA can also include a plurality of X-ray detectors. Each of the X-ray detectors detects X-rays emitted from a foreign substance existing on an inspection target surface of the inspection target object IT irradiated with the X-rays from the X-ray generation portion XG and totally reflected by the inspection target surface. The plurality of X-ray detectors can include a first X-ray detector 1201 configured to inspect a first inspection target surface TS1 of the inspection target object IT, and a second X-ray detector 1202 configured to inspect a second inspection target surface TS2 of the inspection target object IT. The first X-ray detector 1201 can include a first X-ray receiving portion 1211, and the second X-ray detector 1202 can include a second X-ray receiving portion 1212. The first inspection target surface TS1 and the inspection target surface TS2 can be opposite surfaces of the inspection target object IT. The first inspection target surface TS1 and the second inspection target surface TS2 can be arranged symmetrically with respect to a virtual plane VP. The first X-ray receiving portion 1211 and the second X-ray receiving portion 1222 can be arranged to face each other via the virtual plane VP. In FIG. 11, the inspection target object IT can be conveyed by a conveyance mechanism (not shown) in a direction orthogonal to the paper surface. The virtual plane VP can be set to be parallel to a conveyance direction. According to the fifth embodiment, it is possible to inspect two surfaces of the inspection target object IT. The inspection apparatus IA may include a plurality of X-ray generation tubes, but it is possible to reduce the size and cost of the inspection apparatus IA by including only one X-ray generation tube 101.

The present invention is not limited to the above embodiments and various changes and modifications can be made within the spirit and scope of the present invention. Therefore, to apprise the public of the scope of the present invention, the following claims are made.

What is claimed is:

1. An inspection apparatus for inspecting an inspection target object, comprising:
    an X-ray generation tube having a target including an X-ray generation portion that generates X-rays by irradiation with an electron beam, and configured to emit X-rays to the inspection target object; and
    a plurality of X-ray detectors,
    wherein each of the plurality of X-ray detectors detects X-rays emitted from a foreign substance existing on an inspection target surface of the inspection target object irradiated with the X-rays from the X-ray generation portion and totally reflected by the inspection target surface,
    wherein a distance between an inspection plane of the inspection target object and the X-ray generation portion is not larger than 5 mm.

2. The inspection apparatus according to claim 1, further comprising a processor configured to perform processing of detecting the foreign substance based on an output from the X-ray detector.

3. The inspection apparatus according to claim 2, wherein the processor further performs processing of specifying a material forming the foreign substance.

4. The inspection apparatus according to claim 1, wherein the distance is not larger than 3 mm.

5. The inspection apparatus according to claim 1, wherein an angle formed by the inspection plane and a virtual line connecting a center of an X-ray receiving portion of one of the plurality of X-ray detectors and an intersection point of the inspection plane and an axis of the X-ray generation tube is not larger than 5°.

6. The inspection apparatus according to claim 5, wherein the angle is not larger than 2°.

7. The inspection apparatus according to claim 5, further comprising a slit member having a slit on the virtual line.

8. The inspection apparatus according to claim 1, further comprising an X-ray detection panel configured to detect X-rays emitted from the X-ray generation portion and transmitted through an inspection target object having the inspection target surface.

9. The inspection apparatus according to claim 1, wherein the X-ray generation tube is of a sealed transmission type.

10. The inspection apparatus according to claim 1, wherein the X-ray generation tube includes a target holding plate configured to hold the target, and a thickness of the target holding plate is not larger than 4 mm.

11. The inspection apparatus according to claim 10, wherein the target holding plate contains diamond.

12. The inspection apparatus according to claim 1, wherein the plurality of X-ray detectors include a first X-ray detector and a second X-ray detector, and the first X-ray detector and the second X-ray detector are arranged to face each other via the axis of the X-ray generation tube.

13. The inspection apparatus according to claim 1, wherein
the plurality of X-ray detectors include a first X-ray detector including a first X-ray receiving portion and a second X-ray detector including a second X-ray receiving portion, and
an angle formed by the inspection plane and a virtual line connecting a center of the first X-ray receiving portion and the intersection point of the inspection plane and an axis of the X-ray generation tube is different from an angle formed by the inspection plane and a virtual line connecting a center of the second X-ray receiving portion and the intersection point.

14. The inspection apparatus according to claim 1, wherein
the plurality of X-ray detectors include a first X-ray detector and a second X-ray detector, and
a position of the first X-ray detector and the second X-ray detector are different from each other in a direction parallel to the inspection plane.

15. The inspection apparatus according to claim 1, wherein
the plurality of X-ray detectors include a first X-ray detector configured to inspect a first inspection target surface of the inspection target object, and a second X-ray detector configured to inspect a second inspection target surface of the inspection target object,
the first X-ray detector includes a first X-ray receiving portion, and the second X-ray detector includes a second X-ray receiving portion,
the first inspection target surface and the second inspection target surface are arranged symmetrically with respect to a virtual plane, and
the first X-ray receiving portion and the second X-ray receiving portion are arranged to face each other via the virtual plane.

16. An inspection method of inspecting an inspection target object, comprising:
an X-ray detection step of emitting X-rays from an X-ray generation portion to the inspection target object and detecting, by a plurality of X-ray detectors, X-rays emitted from a foreign substance existing on an inspection target surface of the inspection target object and totally reflected by the inspection target surface; and
a processing step of processing outputs of the plurality of X-ray detectors,
wherein a distance between an inspection plane of the inspection target object and the X-ray generation portion is not larger than 5 mm.

17. The inspection method according to claim 16, wherein the processing step includes a step of detecting the foreign substance.

18. The inspection method according to claim 16, wherein the processing step includes a step of specifying a material forming the foreign substance.

19. The inspection method according to claim 16, further comprising a step of detecting, by an X-ray detection panel, X-rays transmitted through an inspection target object having the inspection target surface,
wherein in the processing step, the output of the X-ray detector and an output of the X-ray detection panel are processed.

20. The inspection method according to claim 19, wherein the processing step includes a step of detecting existence of the foreign substance and a position of the foreign substance based on the output of the X-ray detection panel.

21. The inspection method according to claim 19, wherein the processing step includes a step of detecting existence of the foreign substance, a position of the foreign substance, and a size of the foreign substance based on the output of the X-ray detection panel.

22. The inspection method according to claim 16, wherein the processing step includes a step of comparing the outputs of the plurality of X-ray detectors.

* * * * *